March 8, 1966 V. T. DIMITROFF, JR 3,239,677
ELASTIC TURBINE GOVERNING SYSTEM FOR MAINTAINING CONSTANT LOAD
Filed Dec. 3, 1963
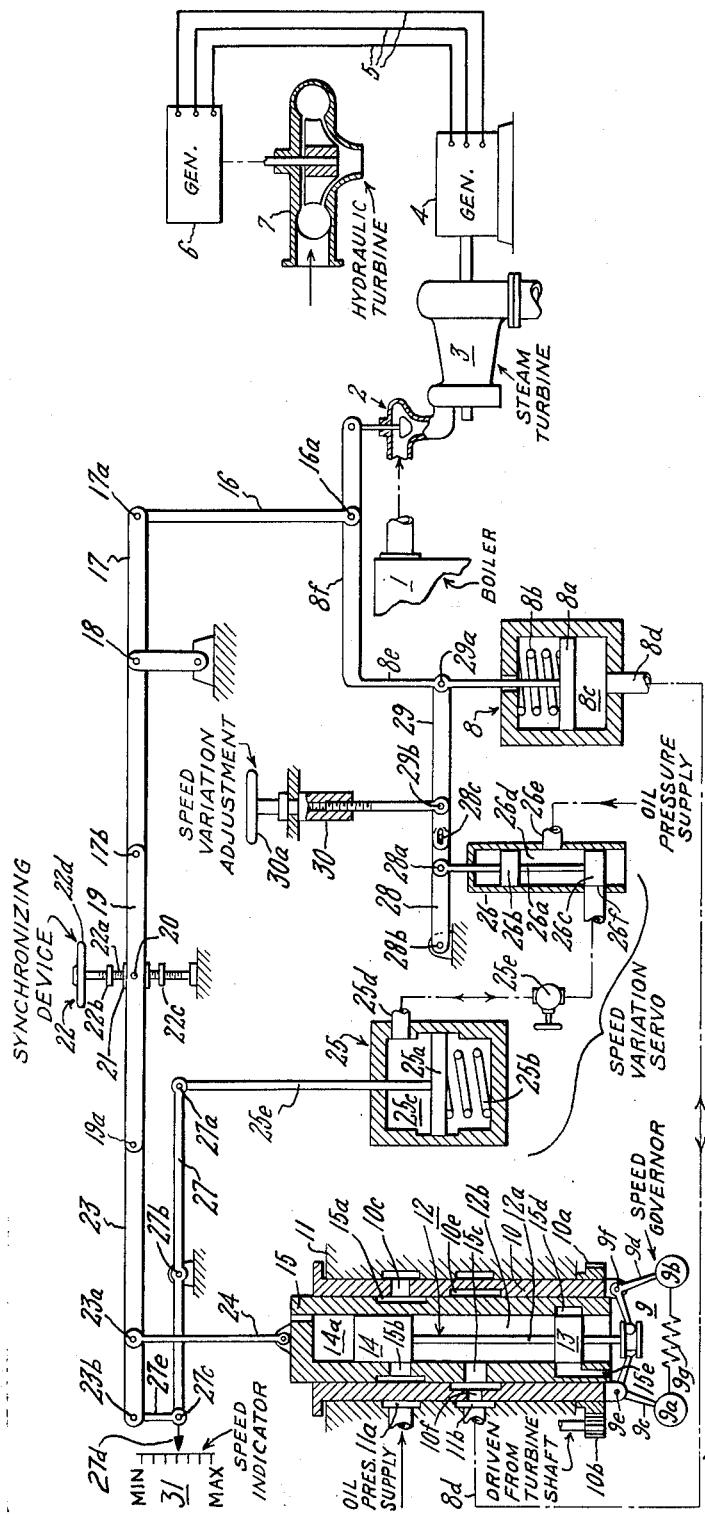
Inventor
Vladimir T. Dimitroff, Jr.
by Arthur W. Kiess
His Attorney

United States Patent Office 3,239,677
Patented Mar. 8, 1966

3,239,677
ELASTIC TURBINE GOVERNING SYSTEM FOR MAINTAINING CONSTANT LOAD
Vladimir T. Dimitroff, Jr., Stoneham, Mass., assignor to General Electric Company, a corporation of New York
Filed Dec. 3, 1963, Ser. No. 327,717
4 Claims. (Cl. 290—40)

This invention relates to governing systems for elastic fluid turbines, such as steam or gas turbines, particularly to such a governing system for a steam turbine interconnected with other turbines in such a manner that the governor of one of the other turbines determines the speed of the interconnected machines, and it is desired to keep the load substantially constant on the steam turbine in question.

This problem arises in electric generating networks supplied by several turbine generators such as those where certain generators are driven by hydraulic turbines having governing devices incapable of holding constant speed as accurately as is possible with the governors of the steam turbines in the network. The result is that the frequency of the alternating current electrical energy delivered to the network is determined by the speed governor of one of the hydraulic turbines, so that the speed of the steam turbines is caused to vary over a significant range, perhaps plus or minus ½ percent of normal rated speed, by reason of the electrical interconnection of the turbines and the generators driven thereby supplying current to the common network.

The resulting speed changes in the steam turbine have the result of requiring the boiler furnishing the steam to change its operating conditions frequently, which is undesirable from the standpoint of efficiency of the boiler. Therefore it becomes advisable to introduce, into the governing system of the steam turbine, means for causing it to maintain the turbine load output constant irrespective of a certain preselected change in the speed dictated by the frequency changes in the electrical network.

Accordingly, the object of the present invention is to provide an improved steam turbine governing system having special means for "desensitizing" the speed governor, so that it will permit a certain preselected change in speed of the turbine without causing a corresponding change in the load output thereof. If the speed change of the system exceeds the preselected value, then the steam turbine governing system does react to cause the turbine to alter the load.

Other objects and advantages will become apparent from the following description, taken in connection with the single figure of the accompanying drawing, showing diagrammatically a constant load governing system in accordance with the invention.

Generally stated, the invention is practiced by providing the steam turbine governing system with an auxiliary servo device which returns the speed governor to its steady state condition over a preselected range of speed variations, without causing a corresponding change in the position of the turbine throttle valve gear.

Referring now more particularly to the drawing, the invention is illustrated as applied to a steam turbine supplied with motive fluid from a boiler 1, under the control of throttle valve gear indicated diagrammatically at 2 as comprising a single valve, although, of course, such a turbine would ordinarily have a number of valves operated in a prescribed sequence. The steam turbine 3 is illustrated as driving a generator 4, connected to an electrical network 5, to which is also connected a second generator 6, driven by a hydraulic turbine 7. The governing mechanism of the hydraulic turbine is not important to the present invention, except to note that it is of a type which permits a significant speed variation in generator 6, for instance perhaps ±½ percent of rated speed. On the other hand, the governing mechanism of the steam turbine 3 is capable of effecting much more accurate speed control. Because of the fact that the alternating current generators 4, 6, are connected to the common electrical network 5, the speed of the turbine-generator 3, 4, will be determined by the speed dictated by the governor of the hydraulic turbine 7. If the throttle valve 2 of the turbine 3 were in fact caused to follow the variations in speed of the hydraulic turbine 7, the boiler 1 would be called upon frequently to alter its rate of steam delivery. Since this is undesirable, the primary purpose of the invention is to provide a special governing system for the steam valve gear 2 with means for causing it to hold constant load, irrespective of certain preselected variations in speed of the generators 4, 6.

This special governing system for the steam turbine 3, comprises a number of conventional elements, including the following. The turbine valve 2 is illustrated as being positioned by a hydraulic motor 8, having a piston 8a, biased in the valve-closing direction by a spring 8b and arranged to be moved in the valve opening direction by hydraulic pressure admitted to the chamber 8c by way of a supply conduit 8d. Piston 8a is illustrated as actuating the valve 2 by means of an L-shaped member 8e, the horizontal portion of which, 8f, moves up and down to position the valve 2 (with no pivoting action relative to the hydraulic motor piston rod 8e).

For given steam inlet temperature and pressure conditions, the load output of steam turbine 3 will be proportional to the degree of opening of the valve gear 2. Thus, the position of the servo piston 8a is a measure of the electrical load being carried by the steam turbine-generator.

The hydraulic motor 8 is under the control of a speed governor indicated generally at 9 as comprising a pair of flyweights 9a, 9b, carried on a pair of L-shaped lever members 9c, 9d, respectively, pivoted at 9e, 9f, to a bushing member 10, which is caused to be rotated by a gear 10a, driven by a second gear 10b, appropriately connected to be driven from the turbine shaft, by means not shown. The speed governor spring 9g biases the flyweights 9a, 9b towards each other so that the inner ends of the L-shaped levers 9c, 9d, move upwardly when the speed decreases and downwardly when the speed increases.

The rotating bushing 10, is carried in a housing member 11, having an oil pressure supply port 11a and an actuating fluid discharge port 11b. The port 11b communicates operating liquid through conduit 8d to the hydraulic servo motor 8. The L-levers 9c, 9d of the flyweight governor are connected to position a longitudinally slidable pilot valve member indicated generally at 12, as comprising a valve stem 12a, having spaced cylindrical lands 13, 14. The slidable pilot 12, is disposed in a second bushing member 15, which is in turn slidably disposed in the rotatable bushing 10. Housing 11 is provided with the annular oil supply groove 11a communicating by way of one or more ports 10c with an annular groove 15a in bushing 15 and of sufficient axial length as to always communicate with port 10c. The slidable bushing 15 is provided with one or more ports 15b communicating with the annular supply groove 15a. Ports 15b are adapted to be covered and uncovered by the lower edge of pilot valve land 14, which as shown in the drawing is of substantially greater axial length than that of the ports 15b, so that operating liquid is never admitted to the chamber 14a above land 14. Movement of the pilot land 14 upwardly uncovers the supply port 15b and admits operating liquid to the chamber 12b, whence it passes by way of port 15c to an annular groove 10e in the rotating bushing 10. The groove 10e communicates by way of port 10f with the discharge annular groove 11b. It will be understood that port 15c is constantly in communication with the groove 10e. The other pilot valve land 13, is of an axial length to cover annular drain groove 15d in the slidable bushing 15, which in turn communicates with a drain port 15e.

The speed governor 9, is of conventional construction quite common in the steam turbine governor art. Simply stated, its operation is that upon a decrease in speed, the flyweights 9a, 9b move towards each other, the pilot 12 rises, operating liquid is admitted from port 11a and discharged through conduit port 11b to the servo motor 8, causing the piston 8a to rise and open the valve 2, so as to tend to increase the load of the turbine 3. Conversely, increase in speed of the governor causes the flyweights 9a, 9b to move apart, permitting the pilot valve 12 to descend, draining fluid from chamber 12b through the ports 15d, 15e, so that operating liquid is drained from chamber 8c, causing spring 8b to move piston 8a downwardly, to close the throttle valve 2.

The feedback linkage by which the speed governor 9 is restored to its steady state condition, includes the following. A link 16 is pivoted at 16a to the horizontal portion 8f of the valve actuating L-member 8e, and is in turn pivoted at 17a, to a lever 17, supported on a fixed fulcrum 18. The other end of lever 17 is pivoted at 17b to a second lever 19, carried on a normally fixed, but vertically adjustable, fulcrum 20. This fulcrum is carried on a yoke member 21, having threaded engagement with a speed adjusting or "synchronizing" device indicated generally at 22 as comprising a threaded rod 22a, rotation of which causes the yoke 21 to rise and fall between limits determined by adjustable abutments 22b, 22c. The synchronizing device 22 may be caused to rotate by the handwheel 22d, or by a remotely controlled motor (not shown).

The left-hand end of lever 19 is pivoted at 19a to a third floating lever 23, an intermediate portion of which is pivoted at 23a to a link 24 connected to position the slidable governor bushing 15.

Assuming for the moment that the left-hand pivot 23b of the floating lever 23 is fixed, the restoring action of this linkage on the speed governor 9 will be seen to be as follows.

When the speed decreases, governor 9 raises pilot valve 12 and admits fluid to servo motor 8, causing the valve 2 to rise, with the result that link 16 causes lever 17 to pivot counterclockwise about fulcrum 18, causing pivot 17b to descend, lever 19 to move clockwise about the pivot 20, so that pivot 19a rises, causing pivot 23a also to rise, pulling the bushing 15 upwardly to restore the pilot 14 to a relative position where it just covers the liquid supply port 15b. Conversely, an increase in speed causes pilot 12 to descend, so that operating liquid is drained from the hydraulic motor 8 and the valve 2 descends, causing the restoring linkage 16, 17, 19, 23, to react in the reverse directions so as to lower bushing 15 and restore pilot land 13 to the position where it again just covers the drain groove 15d.

This restoring action of the above described linkage is also purely conventional.

The special modifying means to which the present invention relates comprises the following elements.

*Speed variation servo*

The special modifying means for causing this governing system to maintain load constant irrespective of a preselected range of speed variation includes a second servo motor 25, controlled by a pilot valve 26. The servo motor 25, comprises a piston 25a biased upwardly by a spring 25b, and arranged to be moved downwardly by oil pressure admitted to the chamber 25c by way of conduit 25d. Piston 25a is connected to a rod 25e pivoted at 72a to a lever 27, having its mid-portion supported on a fixed fulcrum 27b. The left-hand end of lever 27 is pivoted at 27c to a link 27e, connected at 23b to the left-hand end of floating lever 23.

The function of the servo motor 25, is to raise or lower the pivot 23a irrespective of the position of the pivot 19a. Thus, servo motor 25 is enabled to effect a restoring action on the bushing 15 independently of the restoring action produced by the linkage 16, 17, 19.

The servo motor 25 is controlled by the pilot valve 26 consisting of a valve stem 26a having spaced cylindrical lands 26b, 26c, defining therebetween a pressure liquid supply chamber 26d to which operating liquid is supplied by the conduit 26e. The lower pilot valve land 26c is disposed to just cover the liquid discharge port 26f, which supplies operating liquid to conduit 25d, containing a needle valve 25e. The primary function of valve 25e is to regulate the rate of response of the servo motor 25. It may also be used to secure stability in the event the system shows some tendency to "hunt," or to cut out the modifying action of the speed variation servo entirely. That is, closing the needle valve 25e completely will disable the servo motor 25 so that the governing system will operate as if the invention were not present.

The pilot valve rod 26a is pivoted at 28a to a lever 28, one end of which is connected to a fixed fulcrum 28b, the other being pivoted at 28c to another lever 29, which is in turn pivoted at 29a to the valve actuating servo motor piston rod 8e. Lever 29 is carried on a fixed but adjustable fulcrum 29b, adapted to be raised and lowered by threaded member 30, the position of which may be changed by the handwheel 30a.

For purposes of description herein, the servo mechanism 25, 26, will be referred to as the "speed variation servo," and the adjusting device 30, as the "speed variation adjustment."

*Method of operation*

The manner in which the speed variation servo performs its function is as follows:

Assume first that the speed governor 9 experiences a decrease in speed. The flyweights 9a, 9b move towards each other, raising the pilot 12 and admitting actuating liquid to the servo motor 8, tending to raise the turbine throttle valve 2 in the opening direction. The restoring linkage 16, 17, 19, 23 thereupon tends to raise the bushing 15 so as to restore the speed governor 9 to its steady state condition, with the servo piston 8a in a somewhat elevated position from that shown in the drawing, corresponding to an increased opening of the throttle valve 2. However, the upward movement of the piston rod 8e has simultaneously caused the lever 29 to move counterclockwise about its pivot 29b thereby lowering pivot 28c and causing pilot 26a to descend and admit operating liquid from the supply conduit 26e by way of port 26f and conduit 25d to the chamber 25c of servo motor 25, which then lowers piston 25a. Downward movement of piston 25a causes lever 27 to pivot clockwise about its fixed fulcrum 27b so that link 27e causes the left-hand pivot 23b of lever 23 to rise, producing an additional upward movement of bushing 15.

In other words, the effect of the speed variation servo 25, 26 is to augment or anticipate the restoring action ordinarily provided by the linkage 16, 17, 19, 23. As a matter of fact, the servo motor 25 will cause the pivot 23a to rise sufficiently so that the land 13 of the speed pilot 12 uncovers the drain port 15d so that some liquid escapes from the operating cylinder chamber 8c, with the result that piston 8a descends slightly to its original position, as shown in the drawing. The net effect is that the actuating piston 8a and the turbine throttle valve 2 are caused to maintain their original position in spite of the reduction in speed of governor 9 which initiated the process.

Upon an increase in speed of governor 9, the action of the above described elements is in the reverse sense, so that the turbine throttle valve 2 again remains in the same position, in spite of a preselected increase in speed.

Attention is directed to the speed indicator scale 31 disposed adjacent the pivot 27c, having associated therewith the pointer 27d on lever 27. This scale indicates the speed range over which the speed variation servo 25, 26, will keep the load constant. If the pointer 27d rises above the "Min." marking on the scale 31, the capability of the servo 25, 26, to maintain the load constant is exceeded, and any further rise of the pivot 27c would cause the speed governor 9 to effect an increase in load, that is, maintain an elevated position of the piston 8a corresponding to increased opening of the throttle valve 2. Conversely, if the indicator 27d descends below the "Max." indication on the speed indicator scale 31, the speed governor will decrease the load by closing the throttle valve 2 slightly. The general purpose of the speed variation adjustment 30 is to bring the pointer 27d to the center of the scale 31.

The action of the speed variation servo may be better understood from the following description of the integrated operation of the entire system.

Assume first that the turbine 3 is shut down with the generator 4 disconnected from the electrical network 5. Before starting the steam turbine, the speed variation servo is locked out of service by turning the speed variation adjustment handwheel 30a so that pivot 29b is raised, so as to raise pilot 26a and drain the operating fluid from chamber 25c, so that piston 25a moves to the top of its stroke. This puts the speed indicator 27d at the "MAX" position on the speed indicator scale 31.

To start the steam turbine, the synchronizing device 22 is actuated to lower fulcrum 20 and open the turbine throttle valve 2. After the speed of turbine 3 is brought up to that corresponding to the electrical frequency in the network 5, by appropriate actuation of the synchronizing device 22, the generator 4 is electrically connected to the network by closing suitable circuit breakers (not shown). The speed of steam turbine 3 will now be held at a value dictated by the governor of the hydraulic turbine 7 (assuming that turbine 7 is much larger in rating than turbine 3). With the speed of steam turbine 3 thus determined by its electrical interconnection with network 5, the desired load on turbine 3 is selected by further adjustment of the synchroning device 22.

The speed variation servo 25 is put into operation by turning the speed variation adjustment 30 in the direction to lower pilot valve 26a so that operating liquid is admitted to chamber 25c, thus positioning piston 25a so that the speed indicator 27d moves to the mid-position on the speed scale 31. The speed variation servo will now operate as described above to keep the turbine load constant over a speed range of plus or minus ½% of the normal rated speed.

Assume now that a speed increase greater than ½% of rated speed takes place, so that the speed indicator 27d tends to move downwardly past the "MAX" position on scale 31. To correct this, the synchronizing device 22 is actuated to adjust the position of fulcrum 20 so that speed indicator 27d moves upwardly to its mid-position on scale 31. That is, the synchronizing device 22 is thus used to reset the "normal speed" of the steam turbine governing system. The speed variation servo 25 will now again hold the load constant, at plus or minus ½% of this new speed setting. It is to be noted that during this process it has not been necessary to readjust the speed variation adjustment 30.

Conversely, if the speed indicator 27d moves above the "MIN" position on scale 31, the synchronizing device 22 is actuated to lower the indicator 27d to the mid-scale position.

Thus the speed variation servo acts to hold constant load, within a preselected range of speed changes, at whatever "normal" speed is selected by the synchronizing device 22.

If with the governing system operating as above it is now desired to change the load on turbine 3, the synchronizing device 22 is actuated to change the position of throttle valve 2 in the desired direction. This will cause the cause speed indicator 27d to move off-scale, and the speed variation adjustment 30 is then readjusted so as to bring indicator 27d back to its mid-scale position. This adjustment will now cause the speed variation servo to maintain the load constant at the new value selected by the synchronizing device 22.

As indicated above, the throttling valve 25e in the conduit 25d controls the rate at which the load restoring function is accomplished. Ordinarily, frequency variations in the electrical network 5 do not occur rapidly, and the rate of response of the speed variation servo 25 is adjusted by valve 25e so that the load output of steam turbine 3 will vary only one or two percent from the desired load set by synchronizing device 22.

The operating characteristics of the speed variation servo, specifically the speed range over which load will be maintained constant, are determined by the design and proportioning of the levers 27, 28, 29, and the stroke of piston 25a. For instance, in the first governing system in which the invention was employed, the piston 25a traveled through its full stroke corresponding to a total speed change of 1% (plus or minus ½% from the set speed), with a 20% change in load permitted by adjusting the position of piston 8a by resetting the synchronizing device 22. The precise design will depend on the electrical frequency variation expected in the network 5. Knowing this, the governing system can be designed so that the steam flow required from boiler 1 will remain substantially constant during normal frequency variations in the network 5.

Thus it will be seen that the invention provides an improved steam turbine governing system which will permit a preselected variation in speed while holding constant the load output of the turbine. If the preselected speed range is exceeded, then the governor automatically acts to alter the load on the steam turbine appropriately. This new function is performed simply by the addition of an auxiliary servo device which accentuates the action of the restoring or follow-up linkage mechanism ordinarily provided in a governing mechanism of the type described.

While only one form of the invention has been disclosed herein, and that in very diagrammatic form, it will be appreciated by those acquainted with the turbine governing art that numerous modifications and substitutions of equivalents may be made, and that the diagrammatic showing has been considerably simplified, for instance by the elimination of additional stages of hydraulic amplification which would be in an actual system be inserted between the operating cylinder 8a and the throttle valve 2. Various other components conventional in systems of the type described but not necessary to an understanding of the present invention, have also been omitted for purposes of clarity.

It is, of course, intended to cover by the appended claims all such modifications and substitutions of equivalents as fall within the true spirit and scope of the claims.

What I claim as new and desire to secure by Letters Patent of the United States, is:

1. In a governing system for a turbine driving a load device subject to a limited range of speed variation, the combination of:

speed governor means connected to position the throttle valve gear of the turbine, second means connected to modify the action of the speed governor means for adjusting the speed and load output of the turbine to desired values, and hydraulic servo means connected to modify the action of the speed governor means to maintain turbine load constant over a preselected range of speeds, said servo means including pilot valve means connected to be positioned in accordance with movement of the turbine throttle valve gear and supplying operating fluid to a servo motor connected to restore the speed governor to its steady-state condition over a preselected range of speeds whereby the turbine throttle valve gear remains at the preselected setting determined by said second means over said speed range.

2. Turbine governing system in accordance with claim 1 and including:
means for altering the steady-state position of the servo pilot valve means to hold the turbine load constant at various settings of the speed and load adjusting means of the speed governor.

3. A governing system for a turbine driving a load device varying in speed over a limited range in normal operation comprising:
a speed governor controlling first servo means connected to position the throttle valve means of the turbine to vary the speed and load output thereof,
second means modifying the action of the speed governor to adjust the speed and load of the turbine to desired values,
third servo means cooperating with said second means to maintain turbine load constant over a preselected speed range and including means positioned in accordance with movement of said first means and connected to restore the speed governor to its steady-state condition over said pre-selected speed range, whereby the speed governor is prevented from altering the position of the turbine throttle valve means within said speed range.

4. In a governing system for an elastic fluid turbine driving an alternating current generator connected to a network in which the frequency is controlled by another turbine-generator connected to the same network, whereby the speed of the elastic fluid turbine is established by the network frequency, the combination of:
a speed governor controlling first servo-motor means connected to position the throttle valve means of the turbine,
synchronizing means for modifying the action of the speed governor to select the load output desired from the turbine-generator when connected to the network,
and speed variation servo means for maintaining turbine load constant at the value selected by the synchronizing means, irrespective of changes in turbine speed over a preselected range of speeds corresponding to frequency changes normally occurring in the network,
said speed variation servo means comprising pilot means connected to be moved in accordance with movement of said first servo-motor means, and
second servo-motor means controlled by said pilot means and connected to restore the speed governor to steady-state condition and cause the first servo-motor means to maintain the turbine throttle valve means at the position selected by the synchronizing means, within said preselected range of speeds.

No references cited.

ORIS L. RADER, *Primary Examiner.*

G. SIMMONS, *Assistant Examiner.*